United States Patent [19]

Shirahata et al.

[11] Patent Number: 4,588,636
[45] Date of Patent: May 13, 1986

[54] MAGNETIC RECORDING MEDIUM

[75] Inventors: Ryuji Shirahata; Akio Yanai; Tatsuji Kitamoto, all of Kanagawa, Japan

[73] Assignee: Fuji Photo Film Co., Ltd., Kanagawa, Japan

[21] Appl. No.: 348,611

[22] Filed: Feb. 12, 1982

[30] Foreign Application Priority Data

Feb. 13, 1981 [JP]  Japan .................................. 56-19906

[51] Int. Cl.[4] ............................................. H01F 10/02
[52] U.S. Cl. ...................................... 428/336; 427/132; 427/250; 427/294; 428/457; 428/694; 428/900
[58] Field of Search .................. 427/132, 127-131, 427/48, 250, 294; 428/900, 336, 457, 694

[56] References Cited

U.S. PATENT DOCUMENTS 4,172,171 10/1979 Suzuki et al. .................... 427/132
4,323,621 4/1982 Kober et al. .................... 428/900
4,354,908 10/1982 Shirahata et al. ................ 427/132

*Primary Examiner*—Bernard D. Pianalto
*Attorney, Agent, or Firm*—Sughrue, Mion, Zinn, MacPeak and Seas

[57] ABSTRACT

A magnetic recording medium having a thin ferromagnetic metal film formed on a non-magnetic base by vacuum vapor deposition or ion plating is disclosed. The thin ferromagnetic metal film is based on Co and contains 0.05 to 3.0 wt % of Mg.

6 Claims, No Drawings

MAGNETIC RECORDING MEDIUM

FIELD OF THE INVENTION

The present invention relates to a magnetic recording medium using a ferromagnetic metal layer as a magnetic recording layer, and more particularly, to a magnetic recording medium having good magnetic properties and low noise.

BACKGROUND OF THE INVENTION

Most of the conventional magnetic recording media are of the coated type which is produced by dispersing particles of magnetic oxides such as $\gamma$-$Fe_2O_3$, Co-doped $\gamma$-$Fe_2O_3$, $Fe_3O_4$, Co-doped $Fe_3O_4$, a Berthollide compound of $\gamma$-$Fe_2O_3$ and $Fe_3O_4$ and $CrO_2$ or ferromagnetic alloys such as Co-Fe-Cr in an organic binder such as a vinyl chloride/vinyl acetate copolymer, styrene/butadiene copolymer, epoxy resin, or polyurethane resin, applying the resulting coating solution to a non-magnetic base, and drying the coating. However, due to a recent increase in the demand for higher density recording, researchers' attention has been drawn to binder-less magnetic recording media that are free from an organic binder and which use as a magnetic recording layer a thin ferromagnetic metal film that is formed by vapor deposition such as vacuum deposition, sputtering, ion plating or chemical vapor deposition (CVD), or plating such as electroplating or electroless plating. Efforts are being made to use such media on a commercial basis.

Most conventional magnetic recording media of the coated type use a magnetic material that primarily consists of a metal oxide having a smaller saturation magnetization than ferromagnetic metals. Therefore, the magnetic recording layer which must be as thin as possible for higher density recording cannot be made thinner than a certain value beyond which a drop in reproduction output occurs. As a further disadvantage, the process of manufacturing this type of recording medium involves complex steps, as well as a large separate apparatus for solvent recovery or pollution control. One merit of the binder-less magnetic recording medium is that a very thin magnetic recording layer necessary for high-density recording can be formed by using a ferromagnetic metal having a greater saturation magnetization than the magnetic oxides without using a non-magnetic material such as organic binder. Another merit is that this type of recording medium can be made more simply than magnetic recording medium of the coated type.

Studies have been made on the production of the binder-less magnetic recording medium by vapor desposition or ion plating because unlike solution plating treatments, these techniques require no effluent treatment and instead involve simple procedures and can form a film of a desired thickness by using a particular condensation rate (deposition rate). Several methods of vapor deposition are known for producing a magnetic film having a coercive force and squareness ratio desired for a good magnetic recording medium, and three of them are listed below:

(1) Method of controlling the degree of vacuum or vapor deposition rate such as disclosed in A. V. Davies, et al., IEEE Trans. Magnetics, Vol. MAG-1, No. 4 (1965), p. 344; U.S. Pat. No. 3,787,237;

(2) Oblique deposition wherein beams of the vapor of a ferromagnetic metal are directed to a substrate at an angle such as disclosed in W. J. Schule, J. Appl. Phys., Vol. 35 (1964), p. 2558; U.S. Pat. Nos. 3,343,632 and 3,342,633; and (3) Method of condensing the vapor of a ferromagnetic metal on a Cu-base substrate under heating such as disclosed in U.S. Pat. No. 4,226,681.

However, these methods require additional refinements since they are not able to form a magnetic recording medium having the desired magnetic properties. They involve complex procedures of vapor deposition, or they can only be applied to limited types of substrates.

The ion plating process can provide a magnetic film having great coercive force if the gas used is introduced at high pressure. However, the resulting film does not have sufficient adhesion with the substrate. If the gas is introduced at low pressure, the film obtained has very good adhesion with the substrate but its magnetic properties are so poor that a practical magnetic recording medium cannot be obtained.

The binder-less magnetic recording medium using a thin ferromagnetic film produces a greater reproduction output than the conventional magnetic recording medium of coated type, but it also has relatively high noise, and the resulting S/N ratio (signal to noise ratio) is not completely satisfactory. For this reason, noise reduction is one of the objectives in the current development of a commercial binder-less magnetic recording medium.

SUMMARY OF THE INVENTION

One object of the present invention is to provide a new magnetic recording medium using a thin ferromagnetic metal film as a magnetic recording layer.

Another object of the invention is to provide a new binder-less magnetic recording medium having good magnetic properties and low noise.

Therefore, the present invention provides a magnetic recording medium having a thin ferromagnetic metal film formed on a non-magnetic base by vacuum vapor deposition or ion plating, said thin ferromagnetic metal film being based on Co and containing 0.05 to 3.0 wt% of Mg.

As a result of various studies on the production of a magnetic recording medium by vapor deposition or ion plating, the present inventors have found that the magnetic properties of the medium can be improved and the noise reduced by using a Co-based thin ferromagnetic metal film containing 0.05 to 3.0 wt% of Mg.

DETAILED DESCRIPTION OF THE INVENTION

The thin ferromagnetic metal film according to the present invention can be formed by a known method of vacuum deposition with a known apparatus. For details of the vapor deposition process, see, for example, L. H. Holland, "Vacuum Deposition of Thin Films", Chapman & Hall Ltd., 1956; "Handbook of Thin Film Technology", ed. by L. I. Maissel & R. Glang, McGraw-Hill Co., 1970 incorporated herein by reference. The degree of vacuum and condensation speed (vapor deposition speed) are preferably less than $5 \times 10^{-4}$ Torr and in the range of from 0.6 to 60 $\mu$m/min., respectively.

A magnetic recording medium having better magnetic properties and lower noise can be produced by forming the thin magnetic film of the present invention by the known technique of oblique deposition described in U.S. Pat. No. 3,342,632 incorporated herein by reference.

The thin magnetic film of the present invention can also be formed by ion plating according to the methods described in Japanese Patent Publication No. 8328/69 and U.S. Pat. No. 3,329,601 incorporated herein by reference, using an apparatus that is filled with an inert gas and whose degree of vacuum is generally in the range of from $10^{-3}$ to $10^{-1}$ Torr, preferably from $5 \times 10^{-3}$ to $5 \times 10^{-2}$ Torr, at a d.c. voltage which generally ranges from 0.1 to 7 kilovolts, preferably from 0.2 to 5.0 kilovolts. The gases used for ion plating include nitrogen, helium, neon, argon, cryptone, xenon and radon. The DC ion plating process may be replaced by the high-frequency excitation ion plating process described in Japanese Patent Application (OPI) No. 113733/74 (the term "OPI" as used herein refers to a "published unexamined Japanese patent application") wherein a high-frequency voltage is applied through a coil electrode placed between a positively charged vapor source and a negatively charged substrate in a gas atmosphere at $10^{-4}$ to $10^{-3}$ Torr to thereby form a high-frequency discharge region for ionizing the vapor particles. Other alternatives are the cluster ion plating process described in Japanese Patent Application (OPI) No. 33890/74, and the ion plating process described in Japanese Patent Publication No. 11525/68, Japanese Patent Application (OPI) No. 34483/74 and Japanese Patent Publication No. 47910/74 wherein a stream of vaporized material is directed onto the substrate after it is ionized by passing through electron beams.

Vapor sources for the production of a ferromagnetic metal film by vapor deposition and ion plating are mixtures, solid solutions or alloys of Co and Mg which may be used alone or in combination with other elements such as Fe, Ni, Si, V, Y, La, Ce, Pr, Sm, Gd, Mn, Cu, and Cr. A small amount of a non-metallic component such as B, N, O or P may also be contained in the vapor source.

The substrate is generally made of plastics such as polyethylene terephthalate, polyimide, polyethylene naphthalate, polyvinyl chloride, triacetylcellulose and polycarbonate. Alternatively, it may be made of a non-magnetic metal such as aluminum, copper, brass or stainless steel, or even an inorganic substance such as glass or ceramics. Various forms of substrate can be used, such as tape, sheet, card, disc and drum. The thickness and configuration of the substrate is properly determined depending upon the specific use of the magnetic recording medium to be produced.

The thin ferromagnetic metal film of the present invention which is "based on Co" means that it "contains at least 75 wt% of Co". It may contain more than 75 wt% of Co, 0.05 to 3.0 wt% of Mg, with the balance being Fe, Ni, Si, V, Y, La, Ce, Pr, Sm, Gd, Mn, Cu or Cr or mixtures thereof. The composition of the balance is determined by the specific use of the magnetic recording medium. The ferromagnetic metal film is preferably from about 0.02 to 5 μm, more preferably 0.05 to 2 μm thick.

The present invention is now described in greater detail by reference to the following examples which are given here for illustrative purposes only and are by no means intended to limit its scope.

EXAMPLE 1

A tape of polyethylene terephthalate film 23 μm thick was fixed on the substrate holder of a commercial vacuum deposition apparatus having an electron-beam heated vaporization source that was charged with a Co-Mg alloy. The apparatus was evacuated to $5 \times 10^{-5}$ Torr and the vapor of Co-Mg alloy was condensed at 500 Å/sec. to form a film 0.15 μm thick (vacuum vapor deposition). The relation of the Mg content of the magnetic layer (film), its magnetic properties and noise level was as set forth in Table 1 below. The noise level was that of the bulk noise of the tape that was run on a Philips type audio cassette tape deck.

TABLE 1

| Mg Content of Magnetic Layer (wt %) | Magnetic Properties | | Noise (dB) |
|---|---|---|---|
| | Coercive Force (Oe) | Squareness Ratio | |
| 0 | 95 | 0.80 | 15 |
| 0.02 | 85 | 0.78 | 18 |
| 0.05 | 220 | 0.80 | 5 |
| 0.2 | 410 | 0.82 | 0 |
| 0.8 | 520 | 0.83 | −2 |
| 1.5 | 480 | 0.88 | 0 |
| 2.0 | 530 | 0.78 | −3 |
| 3.0 | 370 | 0.70 | 6 |
| 4.5 | 75 | 0.55 | 12 |

The data shows that the vapor-deposited magnetic films that are based on Co and which contain 0.05 to 3.0 wt% of Mg have good magnetic properties and low noise, and hence they can be used to form a good magnetic recording medium.

EXAMPLE 2

A thin magnetic Co-Ni-Mg alloy film 0.2 μm thick was formed on a tape of polyethylene terephthalate film 15 μm thick as in Example 1, except that the Co-Ni-Mg vapor was deposited at an angle of incidence of 56° with the degree of vacuum and condensation speed (vapor deposition speed) being $2 \times 10^{-5}$ Torr and 1000 Å/sec., respectively. The relation of the Mg content of the magnetic layer, its magnetic properties and noise level was as set forth in Table 2 below. The noise level was that appearing in a sideband of 3.5 MHz when a signal was recorded on the tape sample at 4 MHz with a VHS video tape recorder.

TABLE 2

| Mg Content of Magnetic Layer (wt %) | Magnetic Properties | | Noise (dB) |
|---|---|---|---|
| | Coercive Force (Oe) | Squareness Ratio | |
| 0 | 580 | 0.82 | 8 |
| 0.02 | 560 | 0.80 | 12 |
| 0.05 | 810 | 0.93 | 4 |
| 0.3 | 880 | 0.94 | 2 |
| 1.0 | 990 | 0.92 | 2 |
| 1.5 | 970 | 0.93 | 0 |
| 2.0 | 960 | 0.94 | 0 |
| 3.0 | 850 | 0.92 | 2 |
| 5.0 | 590 | 0.79 | 10 |

The Co/Ni ratio was 90:10 (weight ratio) for all the samples.

EXAMPLE 3

A thin magnetic Co-Cr-Mg alloy film 0.30 μm thick was formed on a tape of polyamide film 15 μm thick as in Example 2 except that the angle of incidence was 48° with the degree of vacuum and condensation speed (vapor deposition speed) being $8 \times 10^{-5}$ Torr and 1500 Å/sec., respectively. The noise level of the resulting tape sample was measured as in Example 1. The relation of the Mg content of the magnetic layer, its magnetic properties and noise level was as set forth in Table 3.

TABLE 3

| Mg Content of Magnetic Layer (wt %) | Magnetic Properties | | Noise (dB) |
|---|---|---|---|
| | Coercive Force (Oe) | Squareness Ratio | |
| 0 | 320 | 0.78 | 8 |
| 0.01 | 350 | 0.75 | 6 |
| 0.05 | 690 | 0.92 | 0 |
| 0.25 | 720 | 0.93 | 0 |
| 1.25 | 780 | 0.92 | 2 |
| 3.0 | 650 | 0.94 | 0 |
| 5.0 | 300 | 0.80 | 8 |

The Co/Cr ratio was 97:3 (weight ratio) for all the samples. The data shows that the magnetic recording media having vapor-deposited Co-Cr films containing 0.05 to 3.0 wt% of Mg have good magnetic properties and low noise level.

EXAMPLE 4

A polyimide film 25 μm thick was fixed on the cathode plate of a commercial ion plating apparatus wherein the vaporization source on the anode side was charged with a Co-V-Mg alloy. The apparatus was first evacuated to $5 \times 10^{-6}$ Torr, then filled with argon to increase the pressure in the apparatus to about 1 Torr, and again evacuated to $5 \times 10^{-6}$ Torr. The interior of the apparatus was partially replaced with argon that was supplied through a needle valve to keep the pressure in the apparatus at $2 \times 10^{-2}$ Torr. A voltage of 2.2 kilovolts was applied between the electrodes to generate a glow discharge while the alloy in the vaporization source was vaporized to perform ion plating. The resulting tape samples had magnetic properties and low noise level as indicated in Table 4. The noise level was measured as in Example 2.

TABLE 4

| Mg Content of Magnetic Layer (wt %) | Magnetic Properties | | Noise (dB) |
|---|---|---|---|
| | Coercive Force (Oe) | Squareness Ratio | |
| 0 | 260 | 0.55 | 6 |
| 0.03 | 265 | 0.62 | 12 |
| 0.05 | 450 | 0.79 | 0 |
| 0.1 | 530 | 0.80 | 1 |
| 0.2 | 520 | 0.82 | 2 |
| 1.0 | 550 | 0.80 | 0 |
| 1.8 | 570 | 0.82 | 0 |
| 2.2 | 550 | 0.85 | 2 |
| 3.0 | 500 | 0.82 | 0 |
| 4.0 | 390 | 0.60 | 5 |
| 5.0 | 320 | 0.55 | 8 |

All samples had a magnetic layer 0.12 μm thick that had a Co/V ratio of 88:12 (weight ratio).

As is clear from the foregoing examples, the magnetic recording medium having a magnetic layer that is formed by vacuum vapor deposition or ion plating and which is based on Co and which contains 0.05 to 3.0 wt% of Mg has not only good magnetic properties but also low noise level.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
   a non-magnetic support base; and
   a thin ferromagnetic metal film formed on a surface of said base, said film being formed by vacuum vapor deposition and said film being comprised of 75 weight percent or more Co and 0.05 to 3.0 weight percent Mg.

2. A magnetic recording medium, comprising:
   a non-magnetic support base; and
   a thin ferromagnetic metal film formed on a surface of said base, said film being formed by ion plating and said film being comprised of 75 weight percent or more Co and 0.05 to 3.0 weight percent Mg.

3. A magnetic recording medium as claimed in claim 1, wherein said vacuum vapor deposition is carried out under a vacuum within the range of less than $5 \times 10^{-4}$ Torr.

4. A magnetic recording medium as claimed in any of claims 1 or 2, wherein said thin ferromagnetic metal film has a thickness from about 0.02 to 5 μm.

5. A magnetic recording medium as claimed in claim 4, wherein said ferromagnetic metal film has a thickness from 0.05 to 2 μm.

6. A magnetic recording medium as claimed in any of claims 1 or 2, wherein said thin ferromagnetic metal film contains an additional element selected from the group consisting of Fe, Ni, Si, V, Y, La, Ce, Pr, Sm, Gd, Mn, Cu, or Cr.

* * * * *